United States Patent [19]
Cromer et al.

[11] Patent Number: 5,313,475
[45] Date of Patent: May 17, 1994

[54] ECC FUNCTION WITH SELF-CONTAINED HIGH PERFORMANCE PARTIAL WRITE OR READ/MODIFY/WRITE AND PARITY LOOK-AHEAD INTERFACE SCHEME

[75] Inventors: Daryl C. Cromer, Boca Raton, Fla.; Gene J. Gaudenzi, Purdys, N.Y.; Paul C. King, Boca Raton, Fla.; Kevin G. Kramer, Wappingers Falls, N.Y.; Timothy J. Louie, Boca Raton, Fla.

[73] Assignee: International Business Machines Corporation, Armonk, N.Y.

[21] Appl. No.: 785,558

[22] Filed: Oct. 31, 1991

[51] Int. Cl.⁵ ............................................. H03M 13/00
[52] U.S. Cl. ................................. 371/40.1; 371/40.2; 371/51.1
[58] Field of Search ............... 371/40.1, 40.2, 51.1, 371/49.1, 49.2; 395/425

[56] References Cited

U.S. PATENT DOCUMENTS

| | | | |
|---|---|---|---|
| 3,648,239 | 3/1972 | Cater et al. | 340/146.1 |
| 3,809,884 | 5/1974 | Nibby et al. | 340/172.5 |
| 4,072,853 | 2/1978 | Barlow et al. | 235/312 |
| 4,201,337 | 5/1980 | Lewis et al. | 371/37 |
| 4,241,446 | 12/1980 | Trubisky | 371/37 |
| 4,319,356 | 3/1982 | Kocol et al. | 371/38 |
| 4,345,328 | 8/1982 | White | 371/38 |
| 4,692,922 | 9/1987 | Kiriu et al. | 371/37 |
| 4,712,216 | 12/1987 | Glaise | 371/38 |
| 4,716,545 | 12/1987 | Whipple et al. | 364/900 |
| 4,761,783 | 8/1988 | Christensen et al. | 371/38 |
| 4,775,979 | 10/1988 | Oka | 371/39 |
| 4,852,100 | 7/1989 | Christensen et al. | 371/38 |
| 4,858,236 | 8/1989 | Ogasawara | 371/38 |
| 4,884,271 | 11/1989 | Concha et al. | 371/40.2 |
| 4,897,839 | 1/1990 | Yamagishi et al. | 371/37.1 |
| 4,899,342 | 2/1990 | Potter et al. | 371/10.1 |

FOREIGN PATENT DOCUMENTS

0323030A2 11/1988 European Pat. Off. ..... G06F 11/10
0346629A2 5/1989 European Pat. Off. ..... G06F 13/16

Primary Examiner—Robert W. Beausoliel, Jr.
Assistant Examiner—Ly V. Hua
Attorney, Agent, or Firm—Whitham & Marhoefer

[57] ABSTRACT

An error correcting code (ECC) function and a parity interface scheme providing a translation capability between the ECC and parity protocols is implemented for memory systems in personal computers (PCs). The ECC function addresses the problems of interfacing memory with a variety of other components that may communicate in words composed of differing numbers of bytes. A partial write function within an ECC module permits a read/modify/write operation without extra components, at faster speeds and with minimal use of the system bus. An improved parity/ECC protocol interface is implemented by choosing an appropriate ECC code to facilitate parity generation and checking. This is done by selecting a code that contains groupings of data bits corresponding to the desired parity scheme. The ECC XOR trees are modified to allow parity checking and error correction decode simultaneously, thereby eliminating the need for two sets of XOR trees in the interface.

11 Claims, 9 Drawing Sheets

FIG. 8

PARTICIPATING DATA BITS

| XOR TREE | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | X |   | X |   |   |   |   |   |   | X |   |   |   | X |   |   |   |   |   |   |   | X |   |   |   |   |   |   |   |   |   |   |
| 1 | X | X | X | X | X | X |   | X |   |   | X | X | X | X | X | X |   |   |   |   | X | X | X | X | X | X |   |   | X | X | X |   |
| 2 | X |   | X |   | X |   |   |   |   |   | X | X | X | X |   |   |   |   | X |   |   |   | X |   |   |   | X |   | X | X | X | X |
| 3 | X | X | X |   |   |   |   |   | X | X | X |   |   |   | X | X | X | X | X | X |   |   |   |   | X | X | X | X | X | X |   |   |
| 4 | X |   |   |   |   | X |   |   | X | X | X |   |   | X |   |   |   | X | X |   |   |   | X | X |   |   |   |   | X | X | X | X |
| 5 |   |   |   |   |   |   | X |   |   |   |   |   | X |   |   |   | X |   |   | X |   |   | X |   |   |   |   |   | X | X | X | X |
| 6 |   |   |   | X | X | X |   |   |   |   | X | X | X |   |   |   |   | X | X | X |   |   |   |   | X | X | X |   |   | X | X | X |

ECC FUNCTION WITH SELF-CONTAINED HIGH PERFORMANCE PARTIAL WRITE OR READ/MODIFY/WRITE AND PARITY LOOK-AHEAD INTERFACE SCHEME

BACKGROUND OF THE INVENTION

1. Field of the Invention

The present invention generally relates to error detecting and/or correcting schemes for digital computers and, more particularly, to an error correcting code (ECC) function especially useful for memory systems in personal computers (PCs) and to a parity interface scheme providing a translation capability between the ECC and parity protocols.

2. Description of the Prior Art

Data integrity and system reliability are major concerns for all computer systems. Consequently, various schemes have been developed to insure acceptable levels of error detection and/or correction of data. Parity bits, for example, may be used to detect a single bit error occurring in a finite number of data bits. Various data integrity schemes are particularly appropriate for specific applications in a computer system. For example, error correcting code (ECC) schemes are quite useful for interfacing with memory due to their correction capability coupled with the higher probability of error associated with semiconductor memory. ECC schemes have been used in mainframe computer systems for some time.

As the need for increased data integrity has developed, small systems such as personal computers (PCs) have turned to a stand-alone error correcting code (ECC) function to replace parity schemes in storing and retrieving data from memory. ECC affords the additional protection of single (or more) error correction and multiple error detection by adding a number of check bits to the data before storing it in memory. These check bits, along with the data bits, are decoded after reading from memory to provide the enhanced data integrity.

Existing methods for an ECC buffer to memory provide check bit generation and checking on a large data word which is generally thirty-two bits. However, many components in PCs are only capable of sending or receiving 8-bit or 16-bit units of data, and even 32-bit microprocessors typically do not communicate with memory in 32-bit segments. It is therefore necessary to write words of varying 8-bit or byte lengths while maintaining the integrity of the associated check bits.

In a 32-bit ECC scheme, the check bits that are stored with the data are generated based on the entire thirty-two bits. This makes it necessary to regenerate all of the check bits if even one data bit has changed. Thus, if one byte of data needs to be written to memory, the entire 4-byte double word must first be read, checked and corrected, the new eight bits substituted, and then all four bytes must be rewritten to memory with the appropriate new check bits. The same is true if two or three bytes of data need to be written to memory. This is called a partial write or a read/modify/write operation.

U.S. Pat. No. 4,884,271 to Concha et al. describes a method for handling the read/modify/write problem which uses a correct-on-error scheme where check bits are generated on uncorrected data and then regenerated if the data is found to be in error. This requires a "long" and a "short" read/modify/write cycle, as well as two types of read cycles, to handle data with or without errors, respectively. This approach suffers from being relatively complex in operation. Moreover, the correct-on-error scheme allows data processing to begin while the ECC logic determines if an error is present. This has a disadvantage in that the processor must back up and discard the corrupt data when an error occurs.

U.S. Pat. No. 4,319,356 to Kocol et al. describe a memory that periodically checks and scrubs errors from itself. Kocol et al. do not address the problems of interfacing memory with a variety of other components that may communicate in words composed of differing numbers of bytes.

U.S. Pat. No. 4,852,100 to Christensen et al. describes an error correction and detection method which, like the Concha et al. patent, also incorporates a correct-on-error scheme with multiple ECC sub-blocks. Christensen et al., like Kocol et al., do not address the problems of interfacing memory with a variety of other components that may communicate in words composed of different numbers of bytes. In addition, Christensen et al. use a single ECC unit to handle data of varying numbers of bytes. Column 5 of the Christensen et al. patent describes the dedication of an ECC unit to each sub-block of data for various reasons. While the Christensen et al. approach could be employed to address the problem of storing words of varying numbers of bytes, it is generally not feasible due to the excessive overhead on the number of bit paths and consequently cost and space.

Although an ECC function may be implemented for reading and writing to memory, many computer systems, especially PCs, use parity checking in other applications, most notably the system bus. When more than one integrity protocol is used within a system, an interface must provide translation capability between the different protocols. Typically, such an interface requires separate parity and ECC Exclusive OR (XOR) trees, resulting in signal delay and using valuable silicon real estate.

SUMMARY OF THE INVENTION

It is therefore an object of the present invention to provide a partial write function within an ECC module without extra components, at faster speeds and with minimal use of the system bus.

It is another object of the invention to provide an improved parity/ECC protocol interface.

According to one aspect of the invention, there is provided an improved ECC system which allows data of varying byte lengths to be written to memory without the overhead of prior art solutions and with minimal use of the system bus.

The partial write function is accomplished through the use of internal multiplexing so that the handling of unmodified data is minimized. This is done by overlaying the selected bytes of data read from memory with the new bytes directly within the ECC logic.

According to another aspect of the invention, an appropriate ECC code is chosen to facilitate parity generation and checking. This is done by selecting a code that contains groupings of data bits corresponding to the desired parity scheme. The ECC XOR trees are modified to allow parity checking and error correction decode simultaneously, thereby eliminating the need for two sets of XOR trees in the interface.

BRIEF DESCRIPTION OF THE DRAWINGS

The foregoing and other objects, aspects and advantages will be better understood from the following detailed description of a preferred embodiment of the invention with reference to the drawings, in which:

FIG. 8 is a table illustrating an ECC code with parity groupings used in implementing a improved interface according to a preferred embodiment of the invention;

DETAILED DESCRIPTION OF A PREFERRED EMBODIMENT OF THE INVENTION

Figure 1:
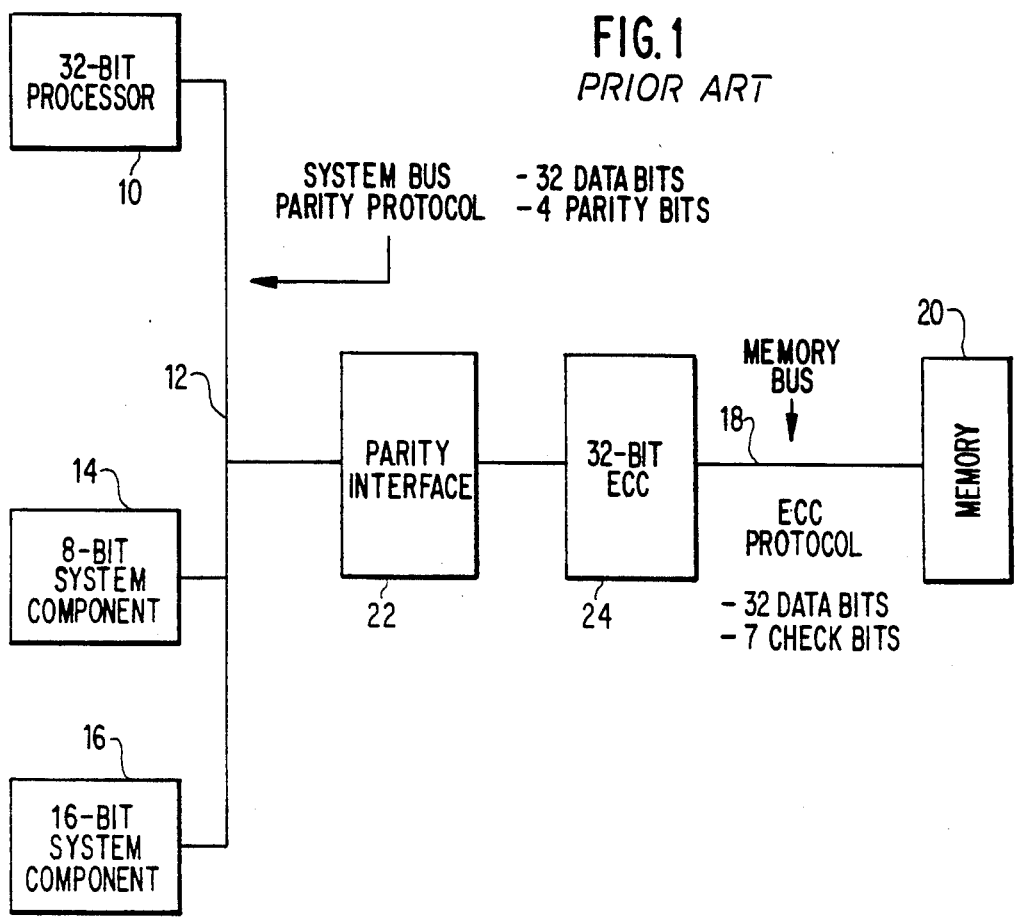
FIG. 1 is a generalized block diagram of a typical computer system of the type in which the subject invention is implemented.

Referring now to the drawings, and more particularly to FIG. 1, there is shown a computer system where a parity protocol is implemented on the system bus and an ECC protocol is implemented on the memory bus. More particularly, a 32-bit microprocessor 10, such as an Intel 80386 or 80486 or a Motorola 68030 or 68040 microprocessor, is connected to a 32-bit system bus 12. An 8-bit component 14, such as for example, a floppy disk controller board, is connected to the system bus 12, and a 16-bit component 16, such as for example a video display adapter, is also connected to the system bus 12. Other components (not shown), either 8-bit or 16-bit, such as a combination facsimile/modem adapter or hard drive controller, may also be connected to the system bus 12.

The system bus 12 is connected to a dedicated 32-bit memory bus 18 by which data is read from or written to a random access memory (RAM) 20. The connection between the two buses is via a parity interface 22 and 32-bit ECC logic 24. As will become clear from the following description, the invention combines the functions of the parity interface 22 and the ECC logic 24 in a single unit, eliminating redundant logic and overhead thereby conserving valuable silicon real estate and improving speed of operation.

The ECC protocol for the memory bus 18 is thirty-two data bits and seven check bits, while the parity protocol for the system bus 12 is thirty-two data bits and four parity bits. In this system, each component attached to the system bus 12, including the parity interface 22, must generate parity when sending to the system bus 12 and must check parity when receiving data from the system bus 12.

Figure 2:
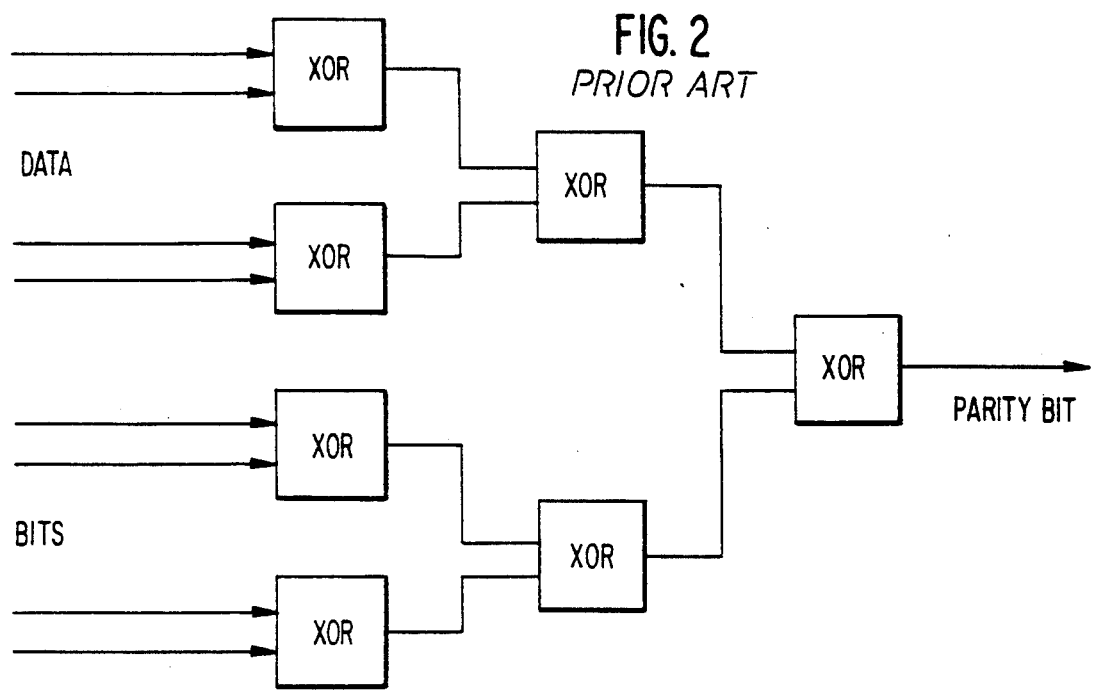
FIG. 2 is a logic diagram showing a typical prior art Exclusive OR (XOR) parity tree.

For a 32-bit bus, four three level Exclusive OR (XOR) trees are typically used to generate and check the four parity bits, one for each byte of data. One such tree is shown in FIG. 2 and comprises seven XOR gates, plus some additional control logic (not shown). Such parity circuits are well known to those skilled in the art and, therefore, need not be described in detail. It is only noted here that the overhead for parity on a group of data bits is the silicon area required for the additional logic plus the delay in generating and checking the parity bits by the XOR gate trees.

Figure 3:
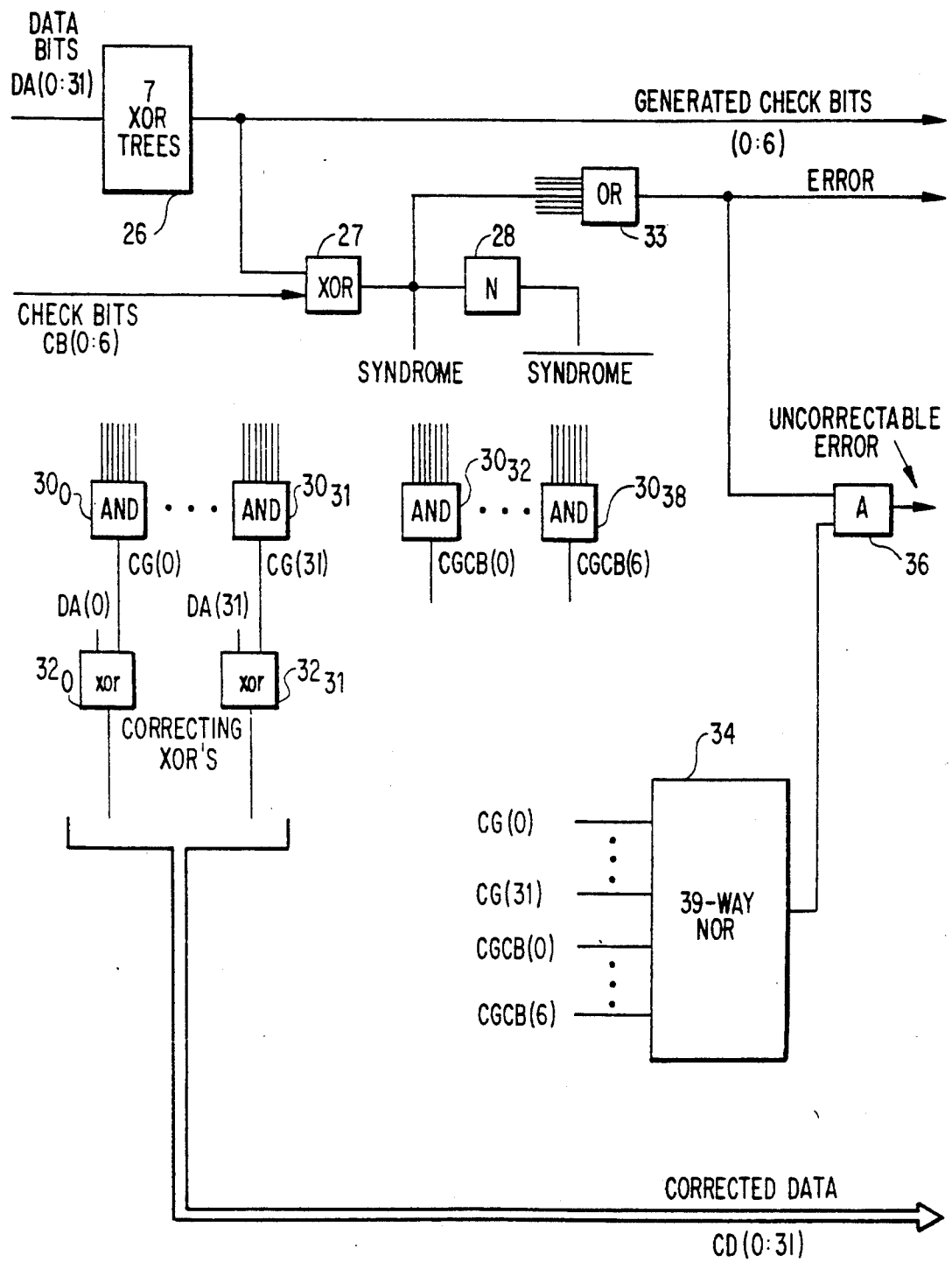
FIG. 3 is a block and logic diagram showing a typical prior art ECC implementation.

FIG. 3 shows an implementation of an ECC code consisting of thirty-two data bits and seven check bits. This code is capable of correcting all single bit errors and detecting all double bit errors. To accomplish this, seven four level XOR trees 26 are used to generate seven check bits. Each XOR tree has inputs from an overlapping subset of the thirty-two data bits, providing a unique coverage pattern for each bit. During a read from memory, the seven received check bits are compared to the outputs of the seven XOR trees 26 in seven XOR gates 27, only one of which is shown for the sake of clarity, to determine if an error is present. This result, called the syndrome, and its complement from inverters 28 (again, only one of which is shown) are then decoded by the thirty-nine seven-input AND gates $30_0$ to $30_{38}$ to locate the exact bit error. A faulty data bit would be identified by a logic "1" at the output of a single decoding AND gate $30_i$, $0 \leq i \leq 31$, and would be flipped by the appropriate correcting XOR gate $32_0$ to $32_{31}$. The outputs of correcting XOR gates $32_0$ to $32_{31}$ are the corrected data.

The outputs of the seven XOR gates 27 are input to a seven input OR gate 33 which provides an output to the system that an error has been detected regardless of whether or not it can be corrected. Thus, an all zero syndrome indicates no error.

The outputs of AND gates $30_0$ to $30_{38}$ are input to a 39-bit (thirty-two data and seven check bits) NOR gate 34. A logic "1" output from the NOR gate 34 reflects the fact that no matching correctable error decode pattern has been detected (i.e., none of the AND gates $30_i$, $0 \leq i \leq 38$, output a logic "1"). A logic "1" output from NOR gate 34 enables AND gate 36. Then, if an error is detected, as indicated by a logic "1" output of the OR gate 33, AND gate 36 outputs a logic "1" to report an uncorrectable error to the system. During a write to memory, the check bits are simply generated by the seven XOR trees 26 and combined with the data.

Figure 4:
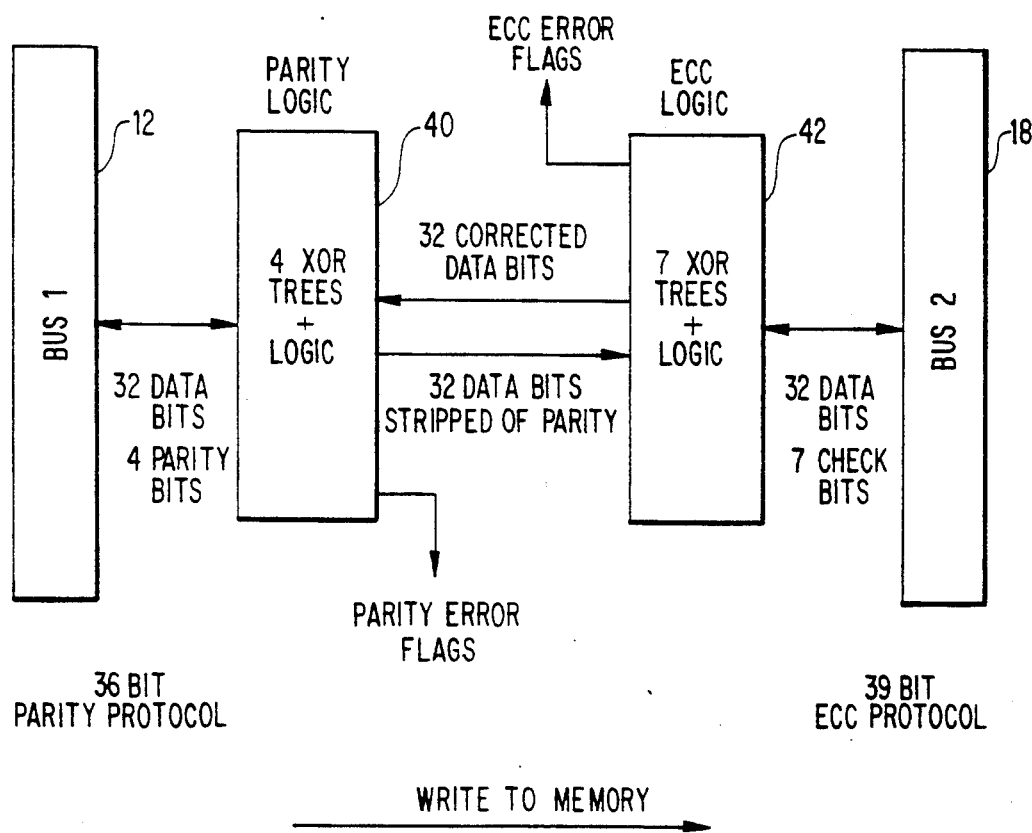
FIG. 4 is a block diagram showing a typical prior art parity/ECC interface.

FIG. 4 shows the classical method of interfacing between a system bus using parity and a memory bus that has implemented ECC. There are two sets of XOR trees between the buses 12 and 18, here denoted as bus "1" and bus "2", respectively. The parity logic 40 comprises four XOR trees, of the type shown in FIG. 2, plus associated logic. There are thirty-six bits, thirty-two data and four parity bits, transferred between the system bus 12 and the parity logic 40. The ECC logic 42 comprises seven XOR trees, and associated logic of the type shown in FIG. 3. There are thirty-nine bits, thirty-two data and seven check bits, transferred between the memory bus 18 and the ECC logic 42.

During a transfer from bus "2" (i.e., memory bus 18) to bus "1" (i.e., system bus 12), the following occurs:

1) The thirty-two data and seven check bits are taken from bus "2" and directed to the group of XOR trees and logic which comprise the ECC logic 42. The XOR trees determine if detectable errors exist in the data.

2) Single bit errors are corrected. Error flags inform the system of all single and double bit errors, as well as detectable multi-bit errors in the data from bus "2".

3) The thirty two corrected data bits are routed to a second set of XOR trees which comprise the parity logic 40. A parity bit is then generated for each eight bits or byte of data.

4) The thirty-two data and four parity bits are sent to bus "1".

A similar procedure is required for a transfer from bus "1" to bus "2". In this case, however, parity error flags inform the system of any detected parity errors. As shown in FIG. 4, this classical approach requires two sets of XOR trees and experiences a finite delay associated with each one.

Figure 5:
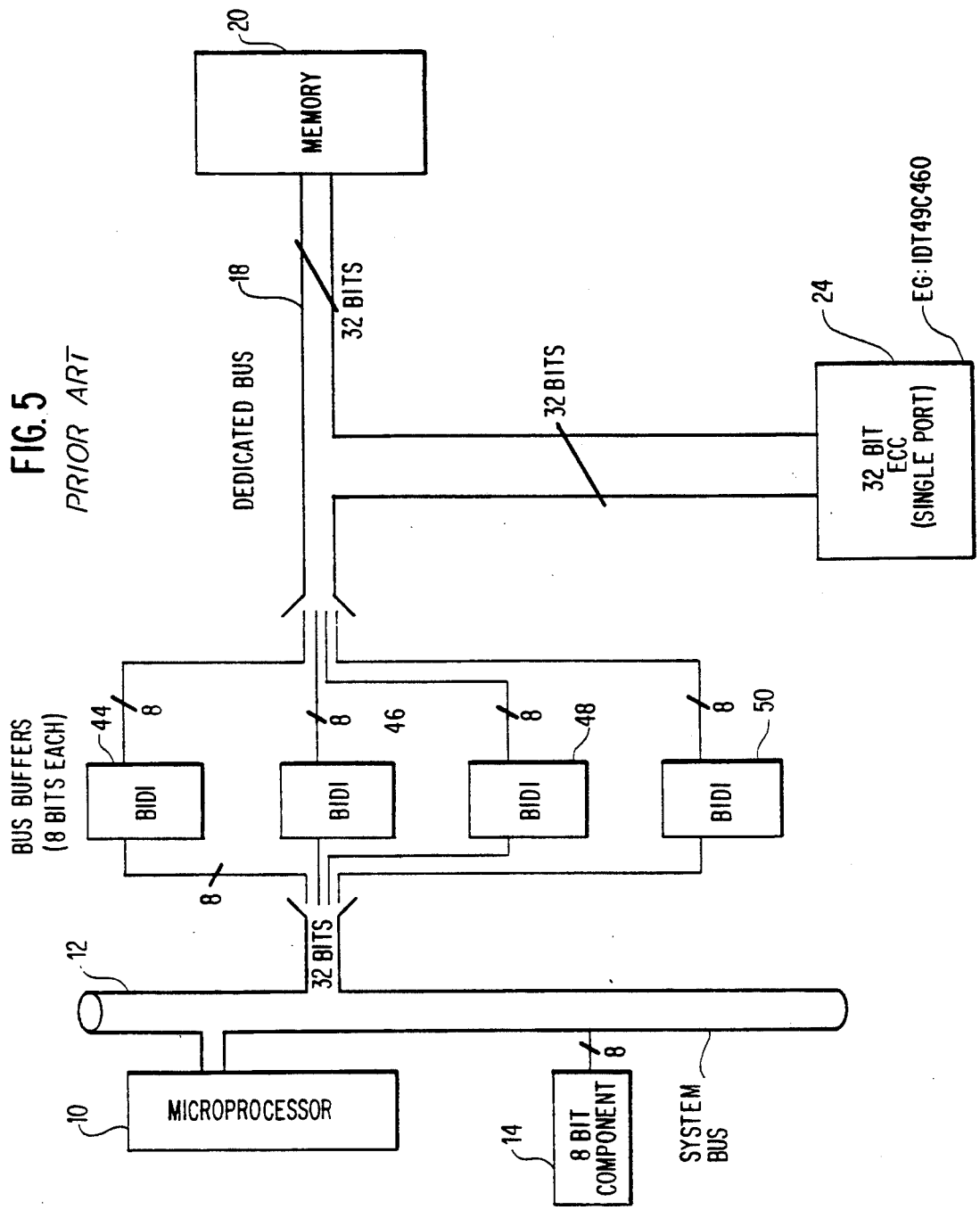
FIG. 5 is a generalized block diagram, similar to FIG. 1, showing a typical prior art partial write implementation.

There are basically two aspects to the present invention. The first is the matter of a partial write or read-/modify/write function in the computer system shown in FIG. 1. FIG. 5 shows an example of a prior art method of implementing a partial write function. The interface between the system bus 12 and the memory bus 18 comprises four 8-bit bidirectional (BIDI) buffers 44, 46, 48, and 50. In addition, a 32-bit ECC module 24 is connected to the memory bus 18, as previously described. The ECC module 24, for example, reads four bytes from memory, correcting and/or indicating any errors, and sends only the data that is not being changed back onto the dedicated memory bus 18. The 8-bit component 14, which wants to write one byte of data, places this data on the appropriate lines of the system bus 12. The four 8-bit buffers 44, 46, 48, and 50 are then either placed into active mode or held in tri-state mode so that the new byte of data together with the three unchanged bytes appear at the input/output (I/O) ports of the ECC module 24. The ECC module then reads the data in, generates new check bits and writes the combination to memory 20. The same can be done for two or three bytes of data being changed, either from the microprocessor 10 or, for example, by a 16-bit component connected to the system bus 12.

One disadvantage of the prior art is the added cost and delay of the bus buffers 44, 46, 48, and 50. One could make an argument that these were not needed; however, the absence of these components in this example would cause lengthy tie-up of the system bus 12 during any memory access. There is also additional delay in this scheme in bringing the corrected data bytes all the way out onto the dedicated memory bus 18 so that they may be read back into the ECC module 24.

Figure 6:
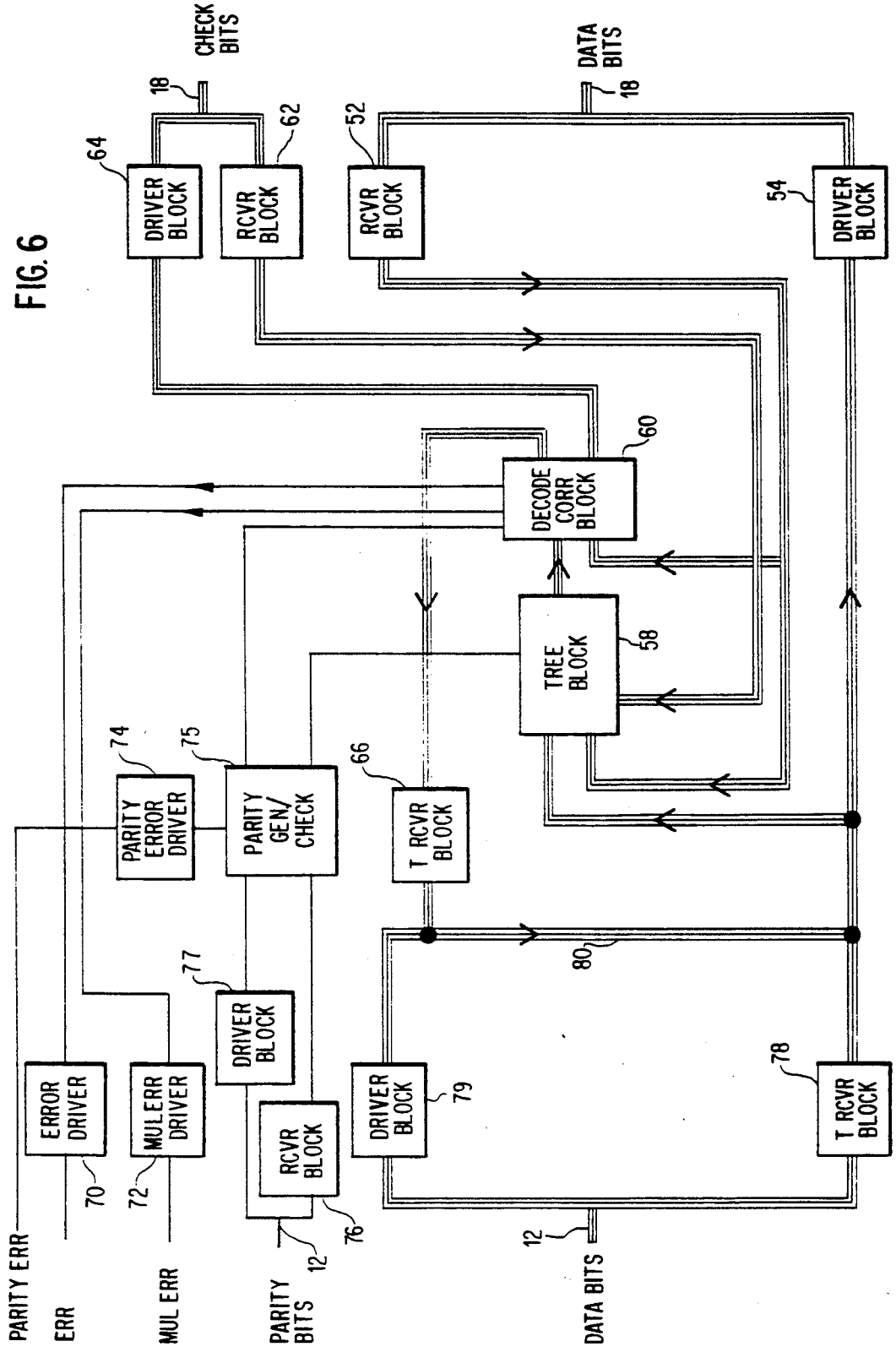
FIG. 6 is a detailed block diagram of the ECC system implementing an improved partial write function according to a preferred embodiment of the present invention.

FIG. 6 shows in detail the preferred embodiment of the improved ECC logic according to a first aspect of the present invention. The thirty-two data bit lines of bidirectional memory bus 18 are connected to both a receiver block 52 and a driver block 54. The thirty-two data bit lines from receiver block 52 are, in turn, connected to a set of XOR trees 58 and decode and correcting logic 60. As described in more detail hereinafter, the XOR trees 58 comprise seven trees, four of which generate both a parity bit and a check bit while the remaining three generate only check bits.

The seven check bit lines of the memory bus 18 are likewise connected to both a receiver block 62 and driver block 64. The output of the receiver block 62 is supplied to the XOR trees 58, the output of which is supplied to the decode and correcting logic 60. The decode and correcting logic 60 has five outputs. One output comprises thirty-two data bit lines to a tri-state receiver block 66. A second output comprises seven check bit lines to the driver block 64. In addition, there are two error outputs, one to a single error driver 70 and the other to a multiple error driver 72. There is also a parity error driver 74 which outputs a parity error flag to the system bus 12 in response to an output from a parity generator and checking logic 75, described in more detail hereinafter with reference to FIG. 10. The logic 75 receives four parity correction outputs from the decode and correcting logic 60 and four parity outputs from the XOR trees 58 and communicates with the four parity lines on the system bus 12 via receiver block 76 and driver block 77.

On the system bus 12 side, the thirty-two data bit lines of bidirectional system bus 12 are connected to both a tri-state receiver block 78 and a driver block 79. The thirty-two data bit lines from tri-state receiver block 78 are, in turn, connected to each of the XOR trees 58 and the driver block 54.

The partial write function is accomplished through internal multiplexing by overlaying the selected bytes of data read from memory with the new bytes as follows:

1) Data is read from memory into and directed through the XOR trees 58 and decode logic 60 producing corrected data at the inputs of tri-state receiver block 66. Tri-state receiver blocks 78 and 66 have mutually exclusive control over internal bus 80. That is, based on input signals which control the receivers in groups of eight, either receiver block 66 or receiver block 78 will be active for a given byte of data. Therefore, during a partial write, receiver block 66 will be active for all bytes of data that are not changing, and receiver block 78 will be active for all bytes of data that are changing. The effect of this is to allow the desired thirty-two bits to appear on bus 80.

2) At this point, the ECC logic, comprising XOR trees 58 and decode logic 60, performs a normal generate with data bits being driven from internal bus 80 out of driver block 54 and check bits out of driver block 64.

A further enhancement of the function is the fact that each receiver block 52, 62, 76, and 78 also contain transparent latches which can be used to free up the external system and memory buses in a very short period of time. Thus, the first aspect of the present invention provides savings in both external components and delay without any impact to the normal ECC write and read performance.

The second aspect of the present invention relates to the interface between the system bus which implements a parity check protocol and the memory bus which implements an ECC protocol. For a 32-bit data bus, four three-level XOR trees are typically used to generate and check the four parity bits, one for each byte of data. Using seven check bits for the error correcting code, the prior art approach, shown in FIG. 4, is to use an additional seven four-level XOR trees. The overhead for parity and ECC on a group of data bits is, therefore, the silicon area required for the additional logic plus the delay in generating and checking the parity bits by the XOR trees. For this reason, the second aspect of the invention contemplates the elimination of the inherent redundancy of two sets of XOR trees, one for parity generation and check and one for check bit generation and check.

Figure 7:
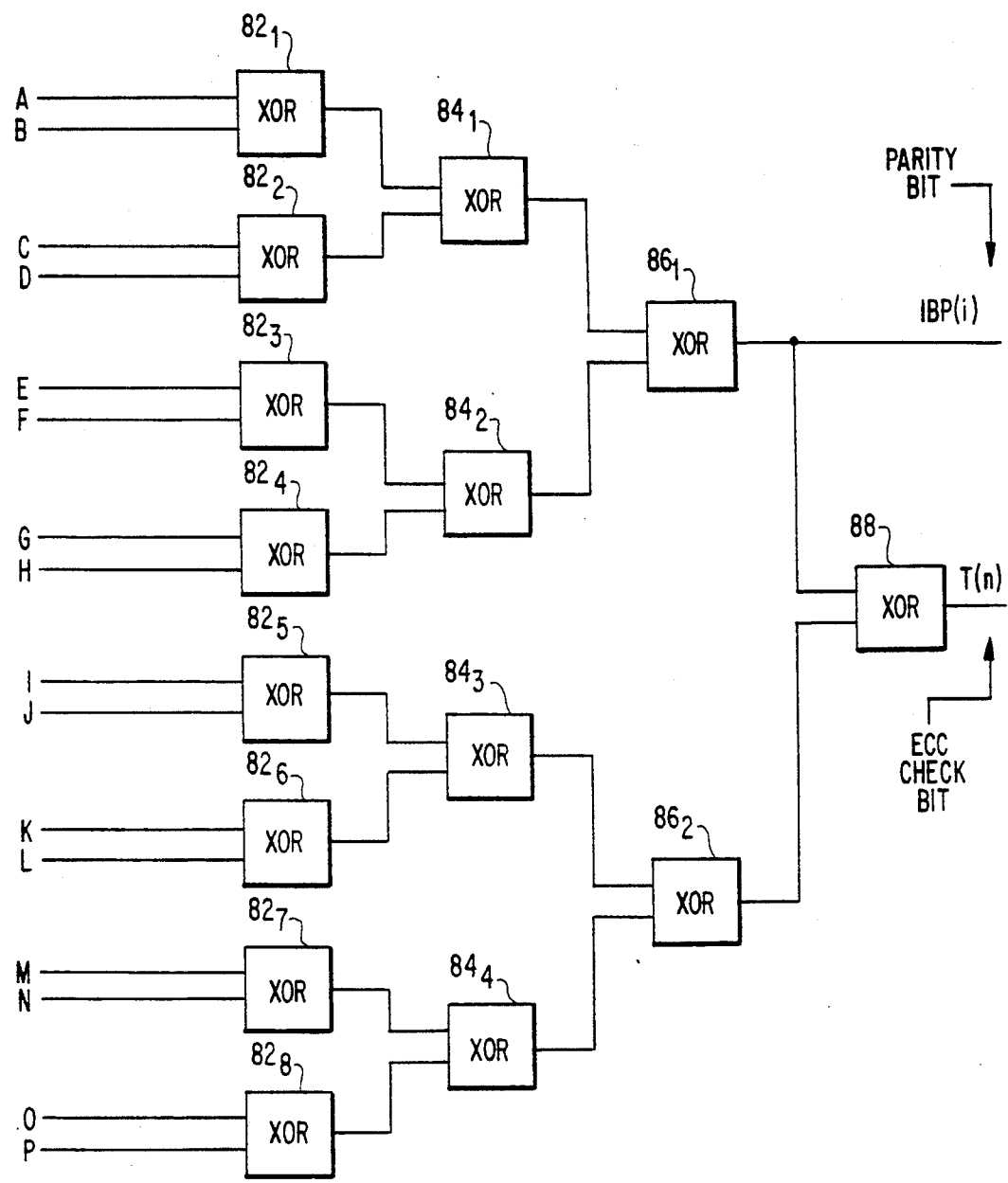
FIG. 7 is a logic diagram showing a modified ECC XOR tree according to the invention.

According to the second aspect of the invention, four XOR trees are used to generate both a parity bit and a check bit each, and an additional three XOR trees are used to generate the remaining three check bits. An example of one of the four combined ECC check bit and parity XOR tree is shown in FIG. 7. The first level comprises eight XOR gates $82_1$ to $82_8$. The inputs to these XOR gates are denoted by the letters A to P, inclusive. The second level comprises four XOR gates $84_1$ to $84_4$, with each pair of XOR gates $82_1$ to $82_8$ providing inputs to XOR gates $84_1$ to $84_4$. The third level comprises two XOR gates $86_1$ and $86_2$, again with each pair of XOR gates $84_1$ to $84_4$ providing inputs to XOR gates $86_1$ and $86_2$. The output of XOR gate $86_1$ is the parity bit $IBP_i$, $0 \leq i \leq 3$, for one of the four bytes of data. Thus, the data inputs A through H only participate in the generation of the parity bit from this XOR tree. The fourth level of the XOR tree comprises the single XOR gate 88 which receives as its inputs the outputs of XOR gates $86_1$ and $86_2$. The output of XOR gate 88 is the ECC check bit $T_n$, $0 \leq n \leq 6$, for the data inputs A through P.

In order to eliminate the need for both sets of XOR trees, an appropriate ECC code is chosen so that the job of parity generation and checking can be made easier. This is done by selecting a code that contains groupings of data bits in its XOR trees corresponding to the desired parity scheme. Table 1 in FIG. 8 illustrates an example of such a code developed by C. L. Chen and M. Y. Hsiao of International Business Machines Corp.

Each row of Table 1 represents an XOR tree. The "Xs" indicate data bits that are inputs to the corresponding tree. Note that XOR tree "1" has, among its inputs, data bits 0 through 7. Once corrected, these eight bits are used to generate parity bit 0 for the system bus. Tree "2" has inputs from data bits 8 through 15, which correspond to parity bit 1. Similarly, trees "4" and "5" contain the bits necessary to produce parity bits 2 and 3, respectively. Given a code such as this, several of the XOR trees may be constructed so that an intermediate node in each of them will represent a parity bit over a given byte of data, as shown in FIG. 7.

Figure 9:
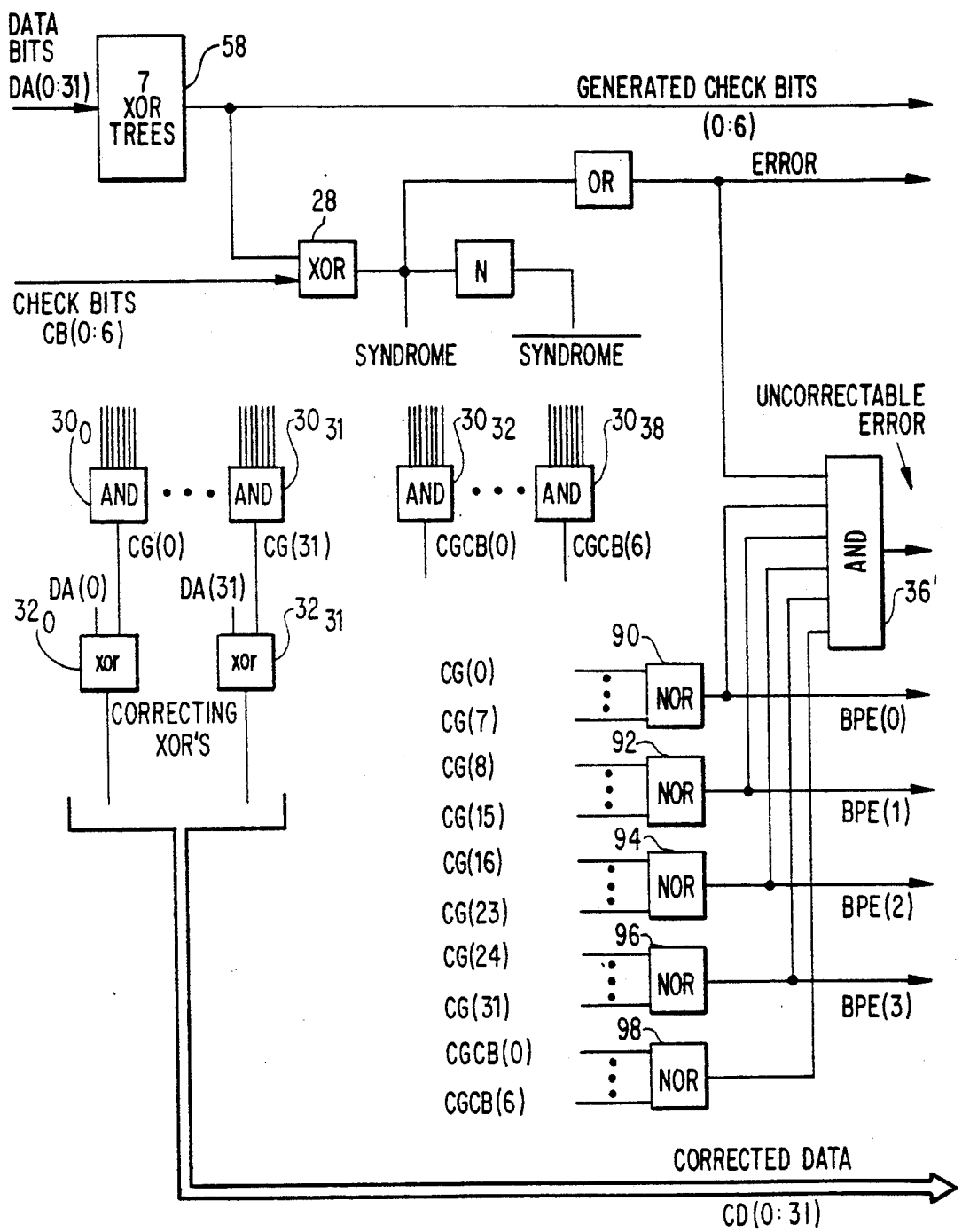
FIG. 9 is a block and logic diagram of an improved ECC implementation according to a preferred embodiment of the invention based on the ECC code illustrated in FIG. 8.

FIG. 9 is a modification of the ECC code implementation shown in FIG. 3, substituting the XOR trees 58 of FIG. 6 which include four XOR trees as shown in FIG. 7. Note that the 39-way NOR gate 34 has been replaced with five NOR gates 90, 92, 94, 96, and 98. Each of the first four NOR gates has inputs from eight AND gates that perform the decode function for a given byte.

The outputs of the four XOR trees shown in FIG. 7, denoted as IBP(i), $0 \leq i3$, are also the parity bits; however, these parity bits are not necessarily correct. If any one of the data bits was in error, the corresponding parity bit will be generated based on the uncorrected data and be in error as well. Recall that the data is not yet corrected as it enters the ECC XOR trees. Therefore, when the single bit error in the data is later corrected, the parity will no longer reflect the data properly.

Fortunately, through some minor changes in the ECC error logic, the correct parity may be determined without using another tree. The logical significance of each of the NOR gate outputs is that each indicates if a correctable error has occurred within that byte of data. This signal may then be used to determine which parity bit must be flipped in order to properly reflect the corrected data sent out onto the system bus 12.

Figure 10:
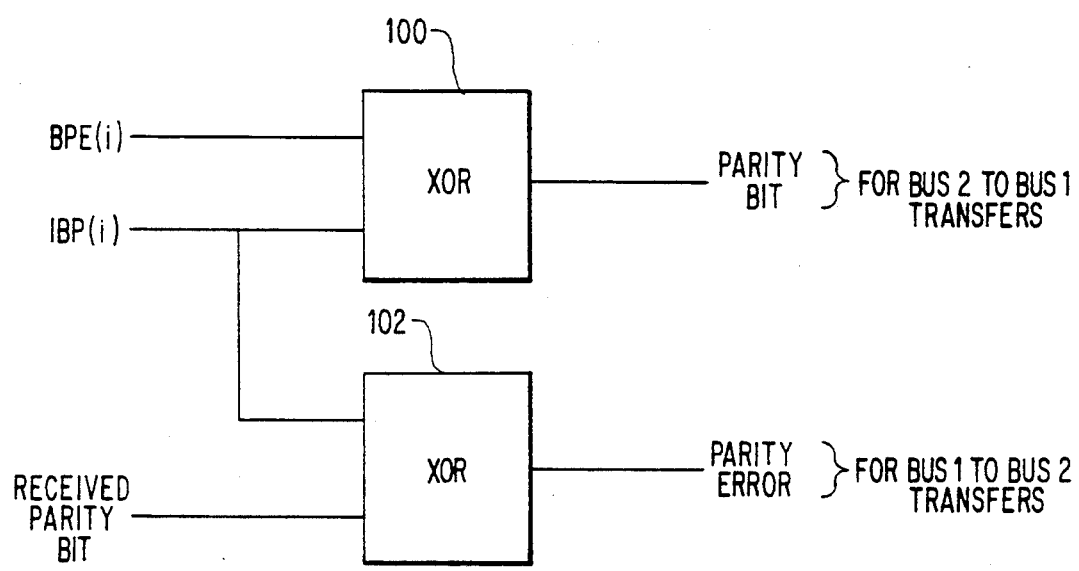
FIG. 10 is a logic diagram of the circuitry which completes parity generating and checking according to a preferred embodiment of the invention.

FIG. 10 illustrates the logic necessary to complete the parity generation. Here, the $BPE_i$, $0 \leq i \leq 3$, signal outputs from the NOR gates 90, 92, 94, and 96, is compared by a respective XOR gate 100 (only one of which is shown for clarity) with the internal parity node (see FIG. 7) from an ECC XOR tree ($IBP_i$, $0 \leq i \leq 3$) to produce the correct parity bit output for transfers from memory bus 18 to system bus 12.

The previous discussion dealt with transfers from the memory bus 18 to the system bus 12, as generally illustrated in FIG. 1. A transfer of data from the system bus 12 to the memory bus 18, using only one set of XOR trees, is summarized as follows:

1) The thirty-two data and four parity bits are taken from the system bus and directed to the seven XOR trees.

2) Seven ECC check bits and four internal parity bits are generated at the same time by the same trees. See FIG. 7

3) The internal parity bits are compared to the received parity bits by XOR gates 102 of FIG. 10. XOR gate 102 (again, one of four) receives the $IBP_i$ input and the corresponding received parity bit from the system bus 12 and generates a parity error if the two are not the same for transfers from the system bus 12 to the memory bus 18.

4) The ECC check bits are sent out onto memory bus 18 along with the thirty-two data bits.

Using the parity look-ahead feature according to the second aspect of the subject invention, the XOR trees illustrated in the parity logic of FIG. 4 are completely eliminated. The result of this is a significant improvement in the performance of the interface, as well as obvious savings in silicon real estate and power. Looked at another way, only three more XOR trees than typically used in a parity system alone are required to perform a full ECC function.

While the invention has been described in terms of a preferred embodiment having two aspects used in a cooperative relationship, those skilled in the art will recognize that the invention can be practiced with modification within the spirit and scope of the appended claims.

Having thus described our invention, what we claim as new and desire to secure by Letters Patent is as follows:

1. A computer system comprising:
a processor and a plurality of components connected to a system bus;
a memory connected to a memory bus;
means interfacing said system and memory buses, said processor and said components communicating in words composed of differing numbers of bytes over said system bus, said interfacing means including error checking and correcting logic connected to said memory bus and providing a partial write function that permits a read/modify/write operation, said interfacing means comprising:
a first receiver connected to said memory bus for receiving data bits and check bits read out of said memory;
a first driver connected to said memory bus for transferring data bits and check bits from the system bus to said memory;
a second receiver connected to said system bus for receiving data bits from said processor and components, said first driver being connected to said second receiver;
a second driver connected to said system bus for transferring data bits to said processor and components;

said error checking and correcting logic connected to said first and second receiver for receiving data bits and check bits and generating corrected data bits and corrected check bits, said first driver being connected to receive said corrected check bits from said error checking and correcting logic, said error checking and correcting logic generating a first error flag upon the detection and correction of a single bit error and a multiple error flag upon the detection of multiple bit errors;

an internal receiver connected to receive corrected data bits from said error checking and correcting logic and supplying said corrected data bits to said second driver; and an internal bus connected to said internal receiver and to said second receiver for transferring corrected data bits subject to a partial write function to said memory via said first driver, said internal receiver being active for all bytes of data that are not changing and said second receiver being active for all bytes of data that are changing during a partial write so as to allow desired bits to appear on said internal bus.

2. The system recited in claim 1 wherein said second receiver further receives parity bits from said processor and components, said error checking and correcting logic 75 additionally generating and checking said parity bits.

3. The system recited in claim 2 wherein said error checking and correcting logic comprises a plurality of Exclusive OR trees, at least some of which generate both check bits and parity bits according to a predetermined error correcting code.

4. The system recited in claim 3 wherein said error checking and correcting logic further comprises a parity generator and correcting logic for generating a corrected parity bit for each byte of corrected data bits read from memory and generating a parity error flag upon detection of a parity error for data transferred from said system bus.

5. The system recited in claim 1 wherein each of said first and second receivers include internal latch means for temporarily storing data respectively transferred from said memory and system buses.

6. A computer system comprising:
a processor and a plurality of components connected to a system bus;
a memory connected to a memory bus;
means interfacing said system and memory buses, said interfacing means including error checking and correcting logic connected to said memory bus, said interfacing means comprising:
a first receiver connected to said memory bus for receiving data bits and check bits read out of said memory;
a first driver connected to said memory bus for transferring data bits and check bits from said system bus to said memory;
a second receiver connected to said system bus for receiving data bits and parity bits from said processor and components; and
a second driver connected to said system bus for transferring data bits form said memory bus to said processor and components;
said error checking and correcting logic being connected to said first and second receivers for receiving data bits, check bits and parity bits and generating corrected data bits, corrected check bits and corrected parity its, said error checking and correcting logic generating a first error flag upon the detection and correction of a single bit error and a multiple error flag upon the detection of multiple bit errors, said error checking and correction logic comprising a plurality of Exclusive OR trees, at least some of which generate both check bits and parity bits according to a predetermined error correcting code.

7. The system recited in claim 6 wherein said error checking and correcting logic further comprises parity generator and correcting logic for generating a corrected parity bit for each byte of corrected data bits read from memory and generating a parity error flag upon detection of a parity error for data transferred from said system bus.

8. The system recited in claim 6 wherein the number of said data bits is thirty-two, the number of said check bits is seven, the number of said parity bits is four, and the number of said Exclusive OR trees is seven, four of which generate both check bits and parity bits and comprise a four level Exclusive OR tree having as inputs sixteen of said thirty-two data bits, eight of which comprise a mutually exclusive byte of said thirty-two data bits but said sixteen data bits comprising one of seven overlapping subsets of data bits which uniquely identify each data bit, an output of an intermediate node of said tree being taken as a parity bit.

9. The system recited in claim 8 wherein said processor and said components communicate in words composed of differing numbers of bytes over said system bus.

10. The system recited in claim 9 wherein said error checking and correcting logic provides a partial write function that permits a read/modify/write operation.

11. The system recited in claim 10 further comprising:
an internal receiver connected to receive corrected data bits form said error checking and correcting logic and supplying said corrected data bits to said second driver; and
an internal bus connected to said internal receiver and to said second receiver for corrected transferring data bits subject to a partial write function to said memory through said first driver, said internal receiver being active for all bytes of data that are not changing and said second receiver being active for all bytes of data that are changing during a partial write so as to allow desired bits to appear on said internal bus.

* * * * *